United States Patent [19]

Jacubert et al.

[11] Patent Number: 4,734,297

[45] Date of Patent: Mar. 29, 1988

[54] PRODUCTION OF SHAPED ARTICLES OF ULTRA-PURE SILICON

[75] Inventors: Serge Jacubert, Viroflay; Bernard Boudot; Philippe Nataf, both of Paris, all of France

[73] Assignee: Rhone-Poulenc Specialites Chimiques, Courbevoie, France

[21] Appl. No.: 792,740

[22] Filed: Oct. 30, 1985

[30] Foreign Application Priority Data

Oct. 30, 1984 [FR] France ................. 84 16544

[51] Int. Cl.[4] ................. C23C 16/24
[52] U.S. Cl. ................. 427/248.1; 423/349; 427/255; 427/314; 427/345
[58] Field of Search ............. 427/51, 86, 248.1, 255, 427/314, 345; 423/349, 350

[56] References Cited

U.S. PATENT DOCUMENTS

| | | | |
|---|---|---|---|
| 3,091,517 | 5/1963 | Short et al. | 423/349 |
| 3,147,141 | 9/1964 | Ishizuka | 118/724 |
| 3,168,422 | 2/1965 | Allegretti et al. | 423/350 |
| 3,900,597 | 8/1975 | Chruma et al. | 427/255 |
| 4,070,444 | 1/1978 | Ingle | 423/349 |
| 4,132,763 | 1/1979 | Schmidt et al. | 423/349 |
| 4,147,814 | 4/1979 | Yatsurugi et al. | 427/86 |
| 4,150,168 | 4/1979 | Yatsurugi et al. | 427/86 |
| 4,173,944 | 11/1979 | Koppl et al. | 427/86 |
| 4,179,530 | 12/1979 | Koppl et al. | 427/86 |
| 4,207,360 | 6/1980 | Padovani | 423/349 |
| 4,311,545 | 1/1982 | Bugl et al. | 427/86 |
| 4,341,749 | 7/1982 | Iya et al. | 423/349 |
| 4,546,009 | 10/1985 | Tiedje et al. | 427/86 |
| 4,597,989 | 7/1986 | Wonsowicz et al. | 427/86 |

FOREIGN PATENT DOCUMENTS 296610 7/1965 Netherlands ................. 423/349

OTHER PUBLICATIONS

Blocher et al., "Survey of Options in a Balanced System for Production of Silicon by Thermal Decomposition of Trichlorosilane", pp. 140-158, TS 695 157 1979.

Primary Examiner—Sadie L. Childs
Attorney, Agent, or Firm—Burns, Doane, Swecker & Mathis

[57] ABSTRACT

Shaped articles, e.g., bars, of semiconductor-grade, ultra-pure silicon, are facilely and efficiently produced by thermally decomposing/pyrolyzing a monosilane feedstream on a red-heated silicon support member, whereby high purity silicon is deposited thereon, and then recycling the majority of the by-product reaction admixture into said monosilane feedstream.

12 Claims, 1 Drawing Figure

PRODUCTION OF SHAPED ARTICLES OF ULTRA-PURE SILICON

BACKGROUND OF THE INVENTION

1. Field of the Invention

The present invention relates to a process for the production of ultra-pure silicon bars, and, more especially, to the production of ultra-pure silicon bars by pyrolysis of monosilane on extended silicon supports heated to redness, the product silicon bars being well adapted for use in the semiconductor electronics industry.

2. Description of the Prior Art

It is known to this art to produce ultra-pure silicon bars useful in the semiconductor industry by reduction with hydrogen of a gaseous halogenated silicon compound, such as silicon tetrachloride or trichlorosilane, and by depositing silicon of high purity onto red-heated supports made of silicon or a metal having a high melting point, such as tungsten. Such processes have been described, for example, in U.S. Pat. Nos. 3,023,087, 4,173,944, 4,179,530 and 4,311,545.

However, the decomposition by pyrolysis of monosilane onto a support heated to redness, to produce silicon bars of electronic purity, differs from the reaction which commences from a halogenated silicon compound in respect of, in particular, the starting materials, the very different by-products formed and the temperatures of the gases and the bars, which are also very different. A device for decomposing monosilane has also been proposed to this art, according to U.S. Pat. No. 3,147,141. The process carried out in this device does not enable useful rates of decomposition to be obtained for large bars under economically acceptable conditions, and furthermore it gives rise to high energy costs and requires the use of a device for absorbing hydrogen.

To reduce the effects of these disadvantages, a process and a device for decomposing pure silane to obtain silicon bars have also been proposed to this art, according to U.S. Pat. Nos. 4,147,814 and 4,150,168. According to this process, pure, that is to say, undiluted, monosilane is introduced into the decomposition bell by injectors arranged at several points along the decomposer. Furthermore, in order to obtain a bar having the most regular shape possible despite the substantial increase in the heat emitted by the bars as they grow in diameter, the decomposer contains internal heat shields cooled by water circulation and situated between the different bars.

Such a process for the deposition of silicon has, however, the following disadvantages:

(i) as a result, in particular, of the gas phase decomposition of the monosilane to a powder which is detrimental to the satisfactory operation of the decomposer, the material yield of the bell, namely, the productivity in silicon deposited relative to the silicon introduced in the form of monosilane, proves to be unsatisfactory;

(ii) furthermore, the rate of deposition of the silicon, and also the diameter which can be attained by the bar when deposition is complete, are inadequate.

In relation to the processes and devices/apparatus of the prior art, serious need continues to exist for process/apparatus satisfying or providing for the following objectives:

(i) to increase the rate of deposition of the silicon, which results in a lowering of the consumption of electricity and an increase in productivity in silicon deposited;

(ii) to increase the final diameter of the bar obtained; and (iii) to reduce the amount of by-products, namely, to increase the material yield of the decomposer.

SUMMARY OF THE INVENTION

Accordingly, a major object of the present invention is the provision of improved process/apparatus for the production of ultra-pure silicon bars by pyrolysis of monosilane onto silicon supports, and which improved process/apparatus not only provide for those desiderata above outlined, but also avoid those disadvantages and drawbacks to date characterizing the state of this art, e.g., the cooled internal heat shields and the multi-stage injection of starting material monosilane.

Briefly, the present invention features a process for the production of silicon bars in a decomposer, or decomposition vessel, by pyrolysis of the feed monosilane onto a support bar which has previously been heated to redness, and which is characterized in that the majority of the reaction mixture emanating from the decomposer is recycled to the feed inlet thereof.

BRIEF DESCRIPTION OF THE DRAWING

The FIGURE of Drawing is a flow diagram of suitable process/apparatus according to the invention.

DETAILED DESCRIPTION OF THE INVENTION

Figure 1:
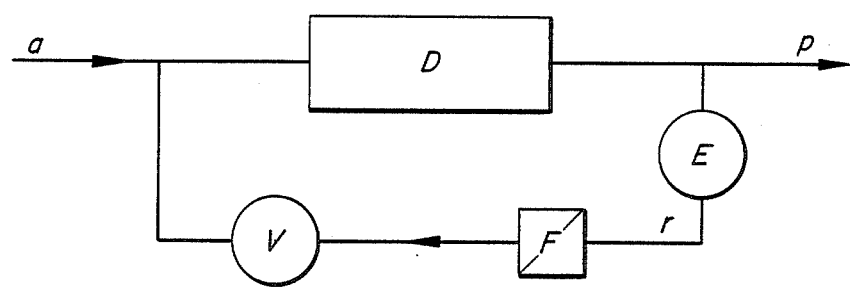

More particularly according to the present invention, the decomposition vessel employed is an otherwise conventional reactor for the pyrolysis of monosilane, that is to say, it is provided with means for heating the support bars, for example, by passage of an electric current therethrough, and is provided in addition with means for cooling its outer jacket, for example, by means of a double jacket cooled by water circulation. Such a basic decomposer is described, in particular, in U.S. Pat. No. 3,147,141. The nature of the support bar is preferably ultra-pure silicon, however other materials such as, for example, tungsten, which is conventionally used in this type of decomposer, are also within the scope of the invention.

Consistent herewith, the majority of the reaction mixture emerging from the decomposer is recycled to the feed inlet of the decomposer. By "majority" there is intended at least 50% by volume, and preferably 85 to 98%. The recycling flow rate is regulated in accordance with the progress of deposition of silicon on the bar. Thus, this flow rate should be greater than 20 $Nm^3/h$ per kg of silicon deposited per hour. Below this flow rate, the rates of deposition do not prove to be especially useful. This flow rate preferably ranges from 20 to 2000 $Nm^3/h$ per kg of silicon deposited per hour, and more preferably from 300 to 1200. This recycling enables the gases inside the decomposer to be maintained at a temperature below 300° C., and typically between 50° C. and 200° C.

The recycling flow rate can be established by any suitable means, for example, by a low-pressure fan equipped with a flow rate varying device.

The non-recycled gases are discharged outside of the system, for example, by means of a bleed device which maintains the pressure constant in the decomposer. Also envisaged is a device which only bleeds the hydrogen present in the gases, for example, using a selective adsorbent for hydrogen, or by means of separation by gas permeation.

Moreover, in a preferred embodiment of the invention, the monosilane concentration in the decomposer is maintained at a constant value by adjusting the rate of topping with undiluted monosilane at the feed inlet of the decomposer. Preferably, the monosilane concentration in the decomposer is maintained at from 0.5 to 5, and preferably from 1.5 to 3.5, molar %. For a deposition of 1 kg of silicon per hour, the monosilane topping rate ranges from 1.15 to 1.5 kg per hour, and preferably from 1.15 to 1.35 kg per hour.

In another preferred embodiment of the invention, gases emerging from the decomposer, and which are recycled, are subjected, preferably after cooling, to filtration in order to remove the silicon powder which may be borne thereby. This filtration makes it possible to eliminate the disadvantages linked to the presence and accumulation of silicon powder in the decomposer, in particular the heat losses which increase energy costs, promote the formation of undesirable by-products and limit the period of deposition; this filtration in addition enables the regularity of the deposition of silicon onto the bar support to be improved.

The filtration is achieved by any suitable means, for example, using a bag filter.

The process of the invention can be carried out at atmospheric pressure increased by the pressure drop of the different apparatuses, or alternatively at a higher pressure, for example, up to 10 bars absolute.

Furthermore, the point at which the non-recycled gases are discharged (bleed) is not critical; it is preferred, however, to perform this upstream of the cooling, filtration and recycling operations.

The present invention will now be described in an especially preferred embodiment, with reference to the flow diagram of the FIGURE of Drawing.

(1) The decomposer (D) comprises a stainless steel, double-jacketed enclosure cooled by water circulation. This enclosure is equipped with electric current conduits to provide for the heating, by the Joule effect, of the silicon bars or bridges which are to be increased in size. The current intensity is adjusted to maintain constant the temperature of the bar, which is measured by optical pyrometry.

(2) The recycling of the gases (r) is provided by a low-pressure fan (V) equipped with a flow rate varying device and preceded by a filter (F). The recycled gases are cooled in the exchanger (E).

(3) The pure silane topping or feed (a) is accomplished from a reserve supply under pressure, using a flow gauge having its set value adjusted to maintain constant the monosilane concentration in the gases within the decomposition vessel. The measurement of this concentration is performed by gas chromatography. The bleed (p) is provided by a gas relief device which maintains the upstream pressure constant.

The process according to the invention enables, in particular, rates of deposition of silicon of 5 to 15 μm/min, and typically on the order of 9 to 10 μm/min, to be obtained, attaining a final diameter for the bar of 5 to 15 cm, and typically on the order of 10 to 12 cm, while the material yield of the decomposer is greater than 90%, and typically greater than 95%, for an electrical consumption of less than 120 kWh/kg of silicon deposited, and frequently less than 100 kWh/kg of silicon deposited.

In order to further illustrate the present invention and the advantages thereof, the following specific examples are given, it being understood that same are intended only as illustrative and in nowise limitative.

EXAMPLE 1

The decomposer used was made entirely from stainless steel and consisted of a double-jacketed base plate cooled by water circulation. This plate was equipped with:

(i) four gastight current conduits cooled by water circulation, each equipped with a device supporting the bar;

(ii) a double-jacketed monosilane injector, cooled by water circulation; and (iii) a vertical shell, cylindrical in shape (1.2 m high) and surmounted by a hemispherical end, the entirety thereof being equipped with a double jacket cooled by water circulation. An aperture was provided in the vertical portion of the shell to enable the temperature of the bars to be measured by optical pyrometry. This tall portion was joined to the base plate by a flange which enabled it to be detached when the deposition was complete, to recover the deposited silicon.

Deposition was performed for a period of 4 hours, which enabled 890 grams of silicon to be recovered on a single bridge of total length 2 m. During this deposition, the average diameter increased from 3 cm to approximately 3.4 cm. The operating conditions were:

(a) concentration (molar) of $SiH_4$ upon charging into the decomposer: 3.4%

(b) concentration (molar) of $SiH_4$ at outflow from the decomposer: 2.5%

(c) temperature of the gases at inlet: 40° C.

(d) temperature of the gases at outflow: 170° C.

(e) recycling flow rates: 18 $Nm^3/h$

The pressure in the decomposer was 0.8 bars relative.

(1) Powder recovered by filtration: 4.5 g over the 4 hours (2) Energy consumption: 110 kWh/kg (3) Material yield:

$$\left( \frac{\text{silicon deposited}}{\text{silicon introduced in the form of monosilane}} \right) = 95\%$$

(4) The average value of the monosilane topping rate was: 0.25 kg/h (5) The bleed flow rate was: 0.35 $Nm^3/h$, containing approximately 0.012 kg/h of monosilane.

EXAMPLE 2

Using the same decomposer as in Example 1, a deposition of long duration was effected, and two bridges 2 m long grew from an initial diameter of 1 cm to a final diameter on the order of 10 cm. The amount recovered was approximately 70 kg for a deposition period of 3 and a half days. The powder recovered in the filter was on the order of 600 g and caused no substantial pressure drop across the filter, the filtering surface of which was 20 $m^2$.

The recycling flow rate provided by the fan varied from 20 $Nm^3/h$ at the start to 950 $Nm^3/h$.

The temperature of the gases emerging did not exceed 150° C. when deposition was complete, the pressure in the decomposer being 1 bar relative.

The average energy consumption was on the order of 95 kWh/kg of silicon deposited.

$$\text{The topping rate was} \left( \frac{\text{Kg/h of monosilane}}{\text{Kg/h of silicon deposited}} \right) = 1.22$$

$$\text{The bleed flow rate was} \left( \frac{\text{in Nm}^3/\text{h}}{\text{Kg/h of silicon deposited}} \right) = 1.7$$

The average material yield obtained was approximately 94%.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of shaped articles of ultra-pure silicon comprising the steps of (i) thermally decomposing/pyrolyzing a monosilane feedstream on a red-heated silicon support member in a decompositon/pyrolysis reaction zone having a gas temperature in said zone which is maintained below about 300° C., wherein high purity silicon is deposited on the support member and a by-product reaction admixture is produced, (ii) recycling the majority of the by-product reaction admixture into said monosilane feedstream, and (iii) cooling the recycled by-product reaction admixture and filtering silicon powder from the recycled by-product reaction admixture prior to introducing said by-product reaction admixture into the monosilane feedstream.

2. The process as defined by claim 1, wherein from about 85 to 98% by volume of said by-product reaction admixture is recycled into said monosilane feedstream.

3. The process as defined by claim 1, wherein said recycle flow rate is greater than about 20 $Nm^3/h$ per kg of silicon deposited per hour.

4. The process as defined by claim 3, wherein said recycle flow rate ranges from about 20 $Nm^3/h$ to 2000 $Nm^3/h$ per kg of silicon deposited per hour.

5. The process as defined by claim 4, wherein said recycle flow rate ranges from about 300 $Nm^3/h$ to 1200 $Nm^3/h$ per kg of silicon deposited per hour.

6. The process as defined by claim 1, further comprising discharging non-recycled, gaseous by-product reaction admixture.

7. The process as defined by claim 1, further comprising maintaining constant the concentration of undiluted monosilane in said monosilane feedstream.

8. The process as defined by claim 1, further comprising maintaining the monosilane concentration in the decomposition/pyrolysis reaction zone at from 0.5 to 5 molar percent.

9. The process as defined by claim 8, wherein said concentration is maintained at from 1.5 to 3 molar percent.

10. The process as defined by claim 7, comprising topping the undiluted monosilane in said monosilane feedstream at a rate of from about 1.15 to 1.5 kg per hour, for a deposition of 1 kg of silicon per hour.

11. The process as defined by claim 7, comprising topping the undiluted monosilane in said monosilane feedstream at a rate of from about 1.15 to 1.35 kg per hour, for a deposition of 1 kg of silicon per hour.

12. The process as defined by claim 1, wherein said filtering is carried out after cooling of said recycle.

* * * * *